(12) United States Patent
Vezza et al.

(10) Patent No.: US 11,789,959 B2
(45) Date of Patent: Oct. 17, 2023

(54) DATA VISUALIZATION METHOD

(71) Applicant: S&P Global Inc., New York, NY (US)

(72) Inventors: Michael Albert Vezza, Weston, MA (US); Jonathan Edward Hoyt Hayden, Westford, MA (US); James Ryan Psota, Cambridge, MA (US)

(73) Assignee: S&P Global Inc., New York, NY (US)

( * ) Notice: Subject to any disclaimer, the term of this patent is extended or adjusted under 35 U.S.C. 154(b) by 63 days.

(21) Appl. No.: 17/450,110

(22) Filed: Oct. 6, 2021

(65) Prior Publication Data
US 2023/0103951 A1   Apr. 6, 2023

(51) Int. Cl.
*G06F 16/248*  (2019.01)
*G06F 16/904*  (2019.01)
*G06F 16/2455* (2019.01)

(52) U.S. Cl.
CPC ...... *G06F 16/248* (2019.01); *G06F 16/24552* (2019.01); *G06F 16/904* (2019.01)

(58) Field of Classification Search
CPC .......... G06F 16/2471; G06F 16/90335; G06F 16/287; G06F 16/248; G06F 16/24552; G06F 16/904
See application file for complete search history.

(56) References Cited

U.S. PATENT DOCUMENTS

| | | | | |
|---|---|---|---|---|
| 8,577,911 B1* | 11/2013 | Stepinski | ............ | G06F 16/3325 707/765 |
| 2007/0247544 A1* | 10/2007 | Imamura | ............. | H04N 23/667 386/E5.072 |
| 2010/0318569 A1* | 12/2010 | Munday | ............... | G06F 21/6227 707/769 |
| 2013/0073586 A1* | 3/2013 | Aubry | ................ | G06F 16/2455 707/769 |
| 2013/0073669 A1* | 3/2013 | Roberts | ............... | H04L 67/5683 709/214 |
| 2015/0058308 A1* | 2/2015 | Zheng | ................... | G06F 16/951 707/706 |
| 2016/0103914 A1* | 4/2016 | Im | ......................... | G06F 16/951 707/770 |
| 2017/0147628 A1* | 5/2017 | Park | ..................... | G06F 16/2365 707/706 |
| 2019/0370392 A1* | 12/2019 | Cazin | .................... | G06F 16/334 707/999.003 |
| 2019/0370397 A1* | 12/2019 | Kummamuru | ........ | G06F 40/295 707/769 |
| 2020/0356487 A1* | 11/2020 | Bitincka | ............. | G06F 12/0875 707/706 |

(Continued)

*Primary Examiner* — Yuk Ting Choi
(74) *Attorney, Agent, or Firm* — Yee & Associates, P.C.

(57) ABSTRACT

A method for data visualization is provided. The method comprises receiving an input comprising a number of search parameters and then creating a cache node for the number of search parameters in the database, wherein the cache node comprises a first reference associated with the number of search parameters. Then identifying a number of search results related to the number of search parameters and storing the number of search results related to the number of search parameters in the cache node. Further, identifying a number of visualization options related to the number of search results stored in the cache node, wherein each visualization option comprises a second reference associated with the cache node.

19 Claims, 6 Drawing Sheets

(56) References Cited

U.S. PATENT DOCUMENTS

| | | | | |
|---|---|---|---|---|
| 2021/0216552 A1* | 7/2021 | Gale | ..................... | G06F 16/283 |
| | | | | 707/706 |
| 2022/0327140 A1* | 10/2022 | Pham | ..................... | G06F 3/038 |
| | | | | 707/706 |
| 2022/0374431 A1* | 11/2022 | Kavali | ................ | G06F 16/2471 |
| | | | | 707/706 |

* cited by examiner

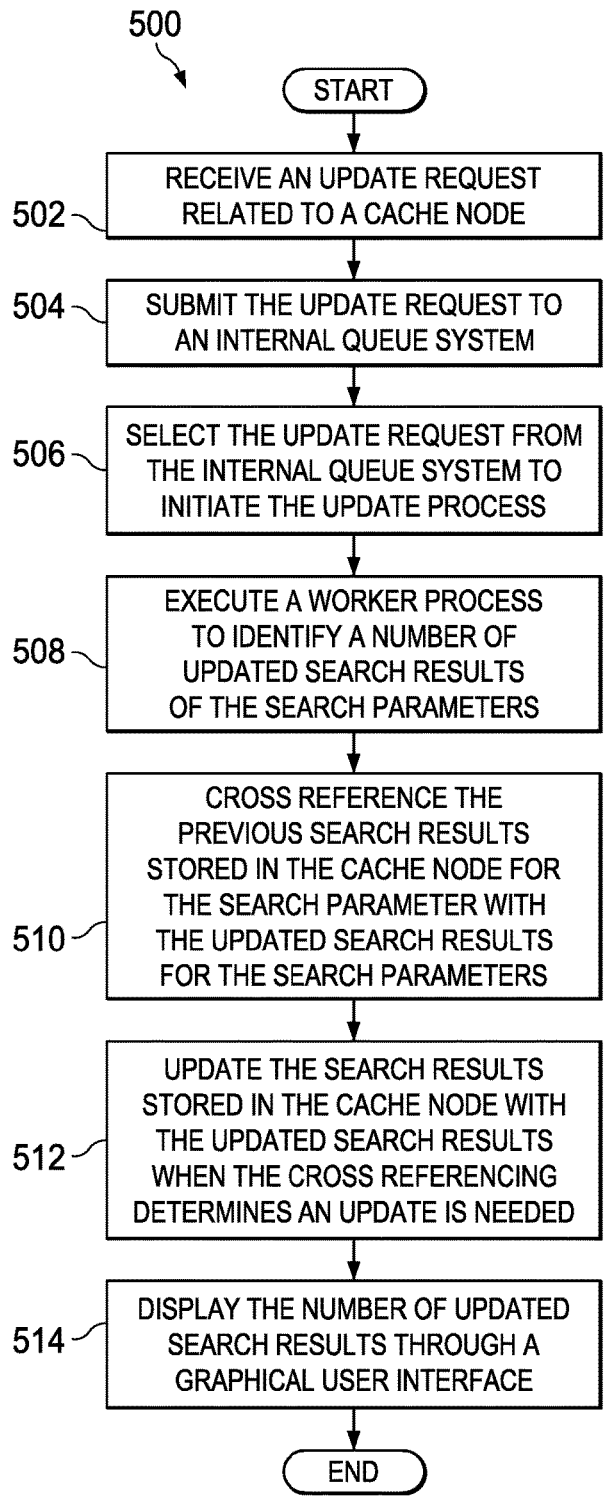
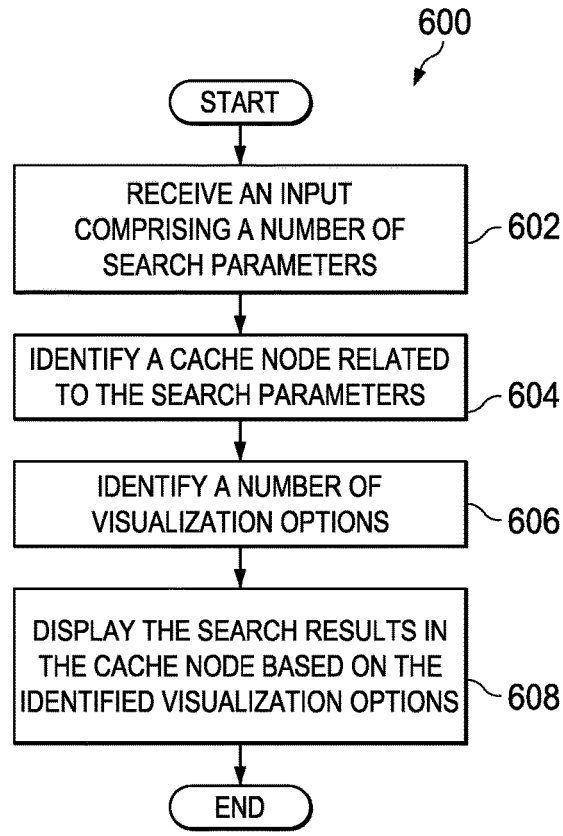
FIG. 5
FIG. 6

DATA VISUALIZATION METHOD

BACKGROUND INFORMATION

1. Field

The present disclosure relates generally to system and methods for fast access information and visualization of that information.

2. Background

Nowadays, global companies heavily rely on efficient and traceable supply chains to plan and deliver their products from product pipelines. Businesses are starting to digitize their supply chain processes. With the combination of Internet of Things (IoT) sensor technology, machine learning and real-time data analytics, a modern supply chain is capable of tracking products from supply to production to distribution, and all the steps in-between.

As increases in global sourcing force retailers to rely on logistics to obtain their products from many geographic locations, inefficiencies and bottlenecks increase waste and make it harder for the retailers to adapt to changing demand from customers. A lack of transparency on logistic operation and compliance, as well as product origins can create operational delays limits the organization's ability to achieve and prove regulatory compliance. Because of expansive and complex networks that involves many moving part, managing and visualization information on these networks can be challenging in light of the amount of data involved.

Therefore, it would be desirable to have a method and apparatus that take into account at least some of the issues discussed above, as well as other possible issues.

SUMMARY

An illustrative embodiment provides a computer-implemented method for visualizing data. The method comprises receiving an input comprising a number of search parameters and then creating a cache node for the number of search parameters in the database, wherein the cache node comprises a first reference associated with the number of search parameters. Then identifying a number of search results related to the number of search parameters and storing the number of search results related to the number of search parameters in the cache node. Further, identifying a number of visualization options related to the number of search results stored in the cache node, wherein each visualization option comprises a second reference associated with the cache node.

Another illustrative embodiment provides a computer-implemented method to update a cache node. The method comprises receiving an update request related to a cache node stored in a database, wherein the cache node comprises a number of search results for a search parameter and submitting the update request to an internal queue system. Then selecting the update request from the internal queue system to initiate the update of the cache node. When initiating the cache node update, executing a worker process to identify a number of updated search results of the search parameter, wherein the number of updated search results are stored the cache node. Then perform a cross referencing on the number of updated search results of the search parameter with the number of search results in the cache node and update the cache node with the number of updated search results if an update is determined to be required by the cross referencing.

Yet another illustrative embodiment provides a system for data visualization. The system comprises a display system and a data visualization system, wherein the data visualization system is configured to receive an input comprising a number of search parameters and then create a cache node for the number of search parameters in the database, wherein the cache node comprises a first reference associated with the number of search parameters. Then identify a number of search results related to the number of search parameters and store the number of search results related to the number of search parameters in the cache node. Further, the data visualization system is also configured to identify a number of visualization options related to the number of search results stored in the cache node, wherein each visualization option comprises a second reference associated with the cache node.

Yet Another illustrative embodiment provides a computer-implemented method to generate a data visualization. The method comprises the step of receiving an input comprising a number of search parameters, wherein the number of search parameters has been previously searched; responsive to receiving the input, identify a cache node in the database, wherein a number of search results related to the number of search parameters are stored in the cache node; identifying a number of visualization options related to the number of search results stored in the cache node; and displaying the number of search results related to the number of search parameters in a graphical user interface based on the number of visualization options. The features and functions can be achieved independently in various embodiments of the present disclosure or may be combined in yet other embodiments in which further details can be seen with reference to the following description and drawings.

According to yet another illustrative embodiment, a computer program product for generating a data visualization, the computer program product comprising a computer readable storage medium having program instructions embodied therewith, the program instructions executable by a computer system to cause the computer system to perform a method of receiving an input comprising a number of search parameters; creating a cache node for the number of search parameters in the database, wherein the cache node comprises a first reference associated with the number of search parameters; identifying a number of search results related to the number of search parameters and storing the number of search results related to the number of search parameters in the cache node; and identifying a number of visualization options related to the number of search results stored in the cache node, wherein each visualization option comprises a second reference associated with the cache node.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is a flowchart of a process for updating the data visualization system in accordance with an illustrative embodiment;

FIG. 6 is a flowchart of a process for reproducing a previous search saved within the data visualization system in accordance with an illustrative embodiment.

DETAILED DESCRIPTION

Data visualization is the graphical representation of information and data by using visual elements like charts, graphs, and maps. Data visualization tools and technologies are essential to analyze massive amount of information for creating new insights that help to improve decision making process.

In general, when visualizing large amount of data such as logistic information, effective data visualization helps to highlight useful information while removing noise from the dataset.

The illustrative embodiments recognize and take into account one or more different considerations. For example, the illustrative embodiments recognize and take into account that the user-to-computer interaction can be jeopardized by the delayed response when a computer system is dealing with massive amounts of data. Therefore, storing relevant information in a structured manner will greatly reduce the time for processing and analyzing data, especially when information is acquired from various sources.

The illustrative embodiments also recognize and take into account that regularly maintaining and updating dataset can be troublesome and time consuming especially when dealing with large amounts of information.

The illustrative embodiments provide a customizable tool that includes fast access to information that can be used for data visualization. A database is in communication with a client device and a number of search parameters are received by the database. The database creates a cache node to store all information related to the search parameters. The database also identifies a number of search results to be stored in the cache node. Visualization options are associated with the search results. The database then identifies a number visualization options of how to display identified search results and displays the research results on the client device through a graphical user interface.

Figure 1:
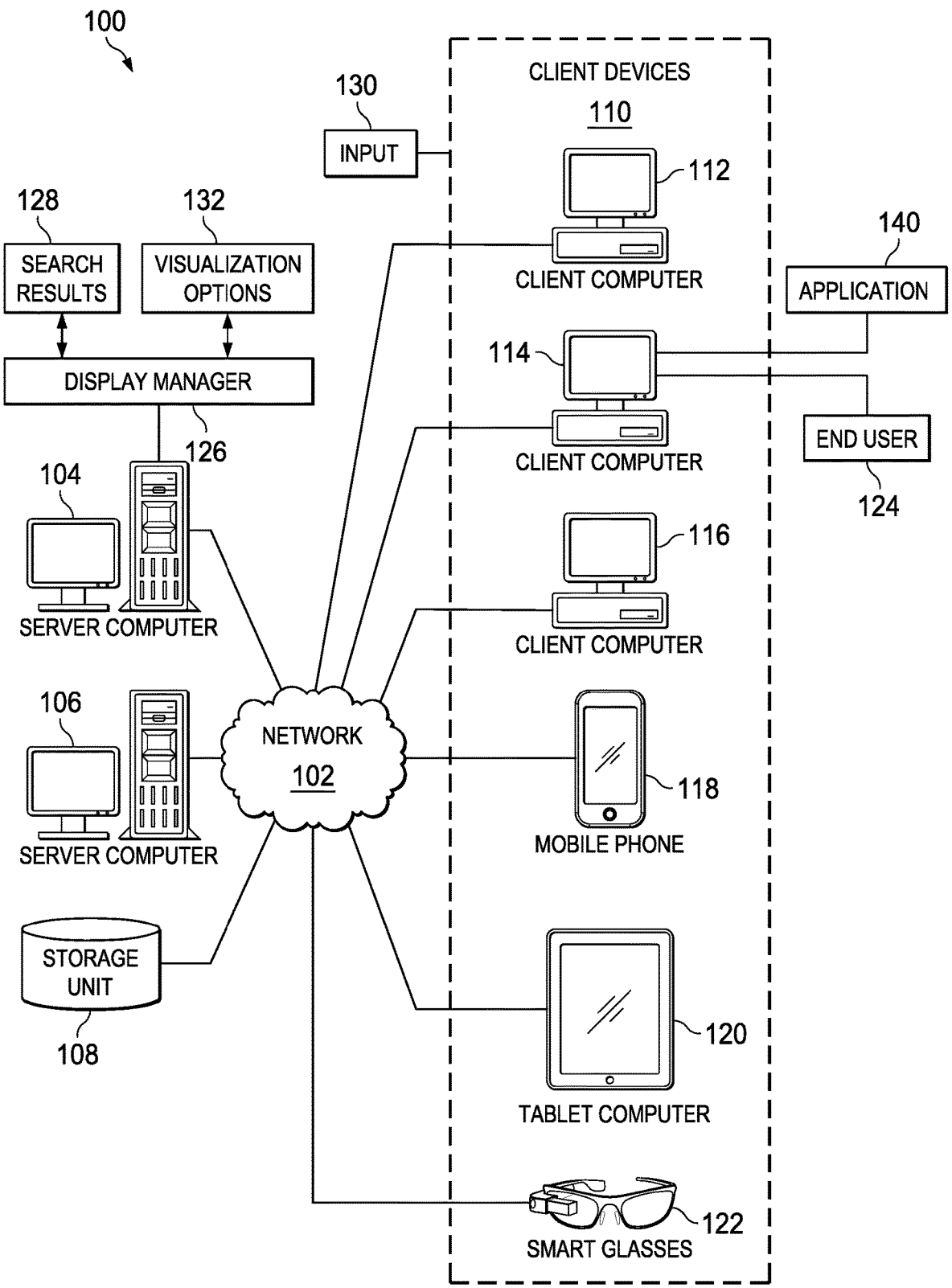
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

In the illustrative example, a "number of" when used with reference to items means one or more items. For example, a number of different types of networks is one or more different types of networks.

In this illustrative example, input 130 can be a number of user entered search parameters from the client computer 114 operated by an end user 124. In this illustrative example, end user 124 may be a person operating one of the client devices 110, for example, client computer 114 or an application 140 running on client computer 114. In this illustrative example, the end user 124 may submit input 130 through a web interface.

In some illustrative examples, the server computer 104 is in communications with server computer 106. In this example, server computer 104 can be a request server such as a webserver configured to receive and transmit data, while server computer 106 is a database server configured to store information related to the searches conducted by end user 124. **It should be understood that the illustrative example is only one embodiment of the current disclosure. The server computers may be hardware servers, or software servers running on a computer or a virtual environment. Server computer 104 and server computer 106 can also be configured to perform any desirable functions. For example, the server computers 104, 106 can be one of a web server, database server, or any suitable server.

In some illustrative examples, input 130 can initiate a retrieval of information to be displayed by an application. For example, input 130 initiates server computer 104 to identify search results 128 and visualization options 132 related to the user entered search parameters from the input 130. The application may be application 140 running on client computer 114, or an application running on a different device, such as a client computer or a server. In this illustrative example, the server computer 104 can be configured to identify which application is appropriate to send the information to be displayed upon reception of the input 130.

The phrase "related to" or "relates to", when used with reference to items, means items are connected by shared characteristics. For example, "search results" related to "search parameters" means "search results" and "search parameters" have shared characteristics and "search results" may be identified based on "search parameter".

Figure 2:
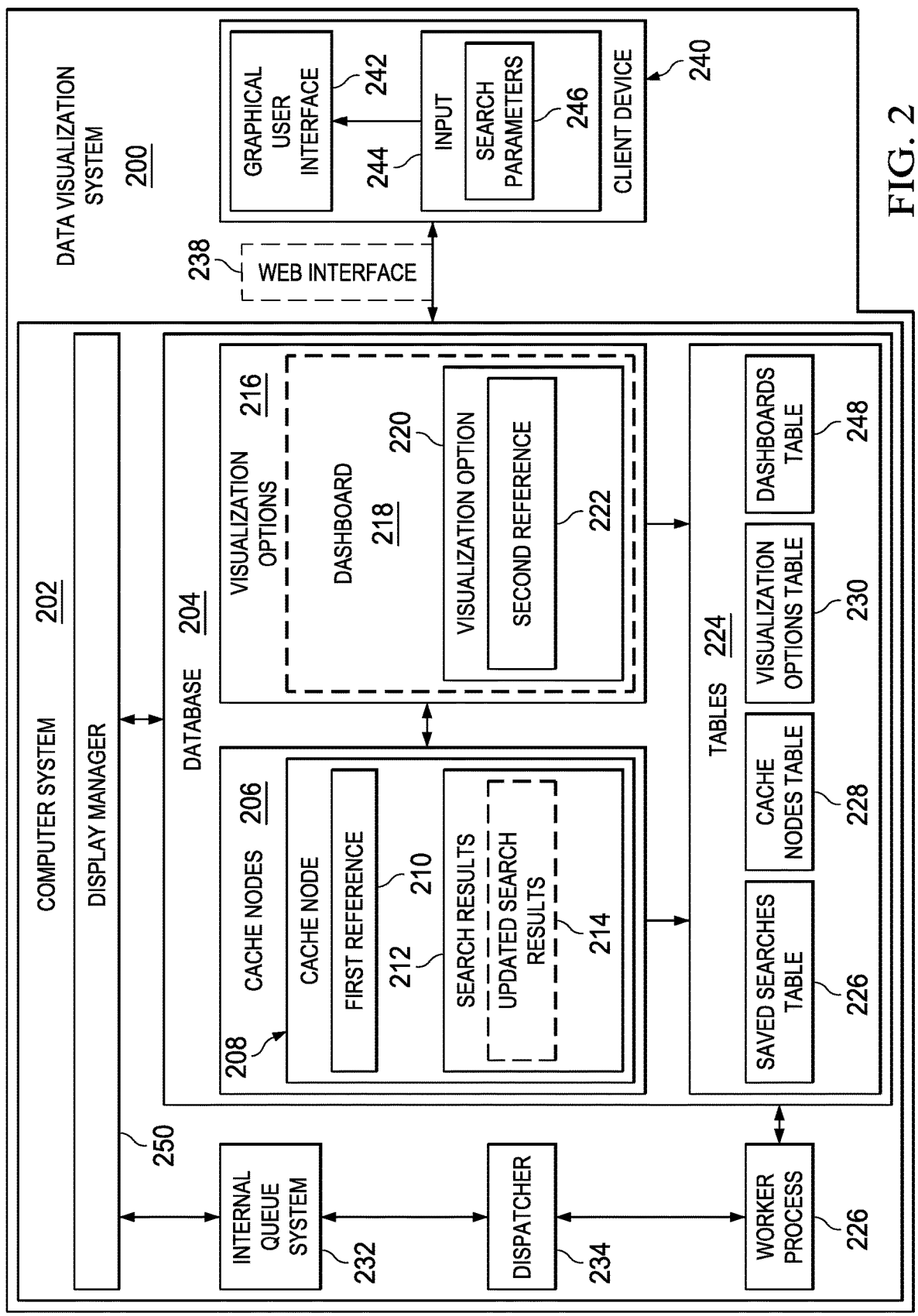
FIG. 2 is a block diagram of a data visualization system in accordance with an illustrative embodiment.

In this illustrative example, display manager 126 is located in server computer 104. display manager 126 can manage receive, and transmit information stored in the form of records located in the server computers such as server computer 104 and server computer 106. For example, display manager 126 can identify search results 128 and visualization options 132. In the depicted example, identified search results 128 can be sent to application 140 running on client computer 114 to be displayed based on visualization options 132. FIG. 2 is a block diagram of a data visualization system depicted in accordance with an illustrative embodiment. Data visualization system 200 might be implemented in network data processing system 100 in FIG. 1.

FIG. 2 is a block diagram of a data visualization system depicted in accordance with an illustrative embodiment. Data visualization system 200 includes components that can be implemented in network data processing system 100 in FIG. 1.

The data visualization system 200 includes a computer system 202 and a client device 240 in communication with the computer system 202. Client device 240 can be an internal device or an external device run by an end user for accessing information in a database 204 in the computer system 202 through a display manager 250. In this illustrative example, client device 240 includes a graphical user interface 242 to display information retrieved from or submitted to the display manager 250. Client device 240 also includes input 244. In this illustrative example, the input 244 comprise a number of search parameters 246 entered by the end user through the graphical user interface 242. The data visualization system 200 can also provide a web interface 238 for computer system 202 to receive input 244. The web interface 238 can be configured to retrieve, create, update, and check the input 244. In this illustrative example, search parameters 246 may comprise search terms, filter categories, database rollups, report keys, or a combination of the above.

Display manager 250 can be implemented in software, hardware, firmware, or a combination thereof. When software is used, the operations performed by display manager 250 can be implemented in program code configured to run on hardware, such as a processor unit. When firmware is used, the operations performed by display manager 250 can be implemented in program code and data and stored in persistent memory to run on a processor unit. When hardware is employed, the hardware may include circuits that operate to perform the operations in display manager 250.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 202 is a physical hardware system and includes one or more data processing systems. When more than one data processing system is present in computer system 202, those data processing systems are in communication with each other using a communications medium. The communications medium can be a network. The data processing systems can be selected from at least one of a computer, a server computer, a tablet computer, or some other suitable data processing system.

As described above, database 204 is in communication with display manager 250. The database 204 can be a relational database, a NoSQL database, a columnar database, an object-oriented database, or any suitable database that can be configured to store and retrieve data. Database 204 further includes a number of cache nodes 206. Each cache node 208 from the number of cache nodes 206 is a representation of a row of information in a cache nodes table 228 stored in the database 204. In this illustrative example, the cache node 208 is configured to store information related to search parameters 246 of a particular search.

Cache node 208 stores a number of search results 212 relates to search parameters 246. In this illustrative example, search results 212 can be any information in the database 204 that relates to search parameters 246. For example, search results 212 can be logistic information such as shipment information, for example, number of shipment, number of shipment over time, shipments by country origin, shipment dates, shipment amount, address and name of buyer, address name of seller, size of shipment, geographical data, and matrix data. In some illustrative example, the information mentioned above are generated and stored by different units of measurement such as records, weight, volume, and value.

Search results 212 can also include updated search results 214. The updated search results 214 are information related to search parameters 246 resulting from another search, for example, a search conducted by the same or different end user at a later time. In this illustrative example, the updated search results 214 can be used to update and refresh the appropriate cache node, for example, cache node 208 so that the information retrieved and displayed by client device 240 is up to date.

Here, cache node 208 may further include a first reference 210 that associates the cache node 208 to search parameters 246.

The display manager 250 receives a number of search parameters such as search parameters 246 from the client device 240 and identifies a number of search results such as search results 212 or updated search results 214 relates to the search parameter 246. The display manager 250 then creates a cache node such as cache node 208 in the database 204 to stores search results 212 and first reference 210 to associate cache node 208 and search results 212.

Database 204 also includes a number of visualization options 216. In this illustrative example, the visualization options 216 can be a method or technique to display the search results 212 in the graphical user interface 242. For example, the visualization options 216 may include aggregate statistics, time series chart, maps, multi-dimensional heatmaps, treemaps, or any other suitable methods or techniques. Here, the visualization options 216 can be manually selected by the end user or automatically selected by the computer system 202 based on default settings or templates.

Visualization options 216 can be configured to include dashboard 218. In this illustrative example, dashboard 218 is a collection of visualization option 220 of a particular search. Visualization option 220 include a second reference 222 that associates the visualization option 220 to the cache node 208. For example, if a particular search generates a time series chart and multi-dimensional heatmaps for the search results from inputted search parameters, the time series chart and multi-dimensional heatmaps associated with the search results can be saved as a dashboard 218 through an interactive button on the graphical user interface 242. In this illustrative example, each dashboard 218 can be a representation of a row in a dashboards table stored in the database 204.

Database 204 can also include a number of tables 224. In this illustrative example, tables 224 are configured to store information related to user conducted searches in an organized manner. Tables 224 can include saved searches table 226, cache nodes table 228, visualization options table 230, and dashboards table 248. The information in each table of tables 224 can be identified from database 204 and stored into tables by display manager 250. As described above, each cache node 208 can be saved as a row in a cache nodes table, for example, cache nodes table 228, and each dashboard 218 can be saved as a row in a dashboards table, for example, dashboards table 248. In this illustrative example, the information in the columns of each table of table 224 can be stored in JavaScript Objection Notation (JSON) format, JSON binary format, text format, or any other suitable formats.

The visualization options table 230 stores information related to the visualization options 216 and association information between visualization options 216 and cache node 208. For example, the visualization options table 230 can be configured to have rows to represents different visualization options and column to represent cache nodes that are associated with each visualization option.

Saved searches table 226 stores information related to each search conducted by the end users. In this illustrative example, the row of saved searches table 226 represents each conducted search, and the column represents the type of information related to the conducted search on that row. For example, the columns of saved searches table 226 may include the time and date of the search, search parameters used, user input that led to the search display, and any other suitable information that can be used to recreate the conducted search. In this illustrative example, one dashboard, for example, dashboard 218 can be a collection of visualization options, where each visualization option includes a reference to a cache node, which includes a reference to a saved search stored in saved searches table 226.

Display manager 250 also continuously monitors the database 204 and determines whether certain cache nodes, for example, cache node 208 of cache nodes 206 needs to be updated with search results that would render the currently cached search results obsolete. For example, display manager 250 can make a determination of whether an update is needed by a time-based trigger, for example, once an hour, once a day, once every two days, or any suitable time interval. In an alternative illustrative example, the display manager 250 can also make a determination of whether an update is needed by a user-activity based trigger which initiates the update process based on user preference, or when database 204 detects new search results, e.g., updated search results 214 are present in the database 204. Display manager 250 initiates the update process after determining an update is needed.

Display manager 250 sends an update request to the internal queue system 232 once the update process for a cache node of interest is initiated. The internal queue system 232 is a list of update requests that are required to be resolved. Computer system 202 further include a dispatcher 234 in communication with the internal queue system 232. The dispatcher 234 is software used to determine which update request from the internal queue system 232 should be resolved first. The dispatcher software can make the determination based on at least one of priority algorithm, load-balancing algorithm, and fairshare algorithm. After selecting the update request from internal queue system 232, the dispatcher 234 executes a worker process 236 to perform the update of cache node of interests. The worker process 236 is a software application running to cross reference the updated search results with the search results already stored in the cache node of interest. Further, the worker process 236 is also configured to update the cache node of interest with updated search results when differences can be identified from cross referencing. In this illustrative example, the updated search results can be, for example, updated search results 214.

As used herein, a processor unit is a hardware device and is comprised of hardware circuits such as those on an integrated circuit that respond and process instructions and program code that operate a computer. When a number of processor units execute instructions for a process, the number of processor units is one or more processor units that can be on the same computer or on different computers. In other words, the process can be distributed between processor units on the same or different computers in a computer system. Further, the number of processor units can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, processor units may be located in computer system 202 which is a physical hardware system and includes one or more data processing systems. When more than one data processing system is present in computer system 202, those data processing systems are in communication with each other using a communications medium. The communications medium may be a network. The data processing systems may be selected from at least one of a computer, a server computer, a tablet, or some other suitable data processing system.

Figure 3:
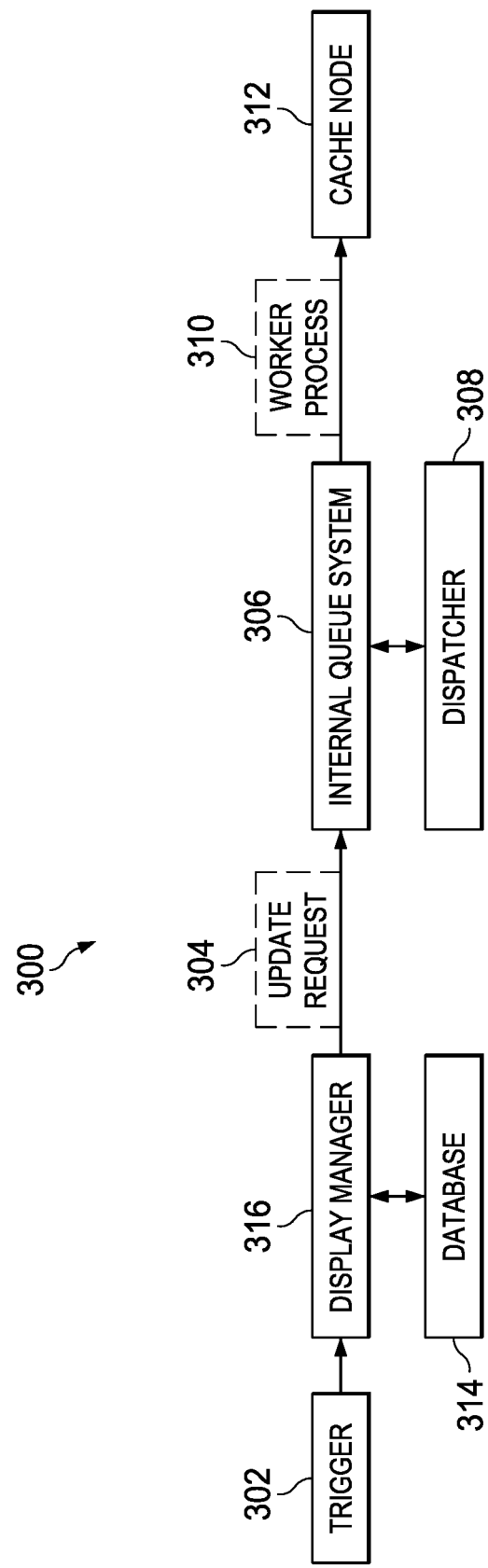
FIG. 3 is an illustration of updating the data visualization system in accordance with an illustrative embodiment.

With reference next to FIG. 3, a data flow diagram illustrating how a cache node is updated by transmitting an update request through data visualization system 200 is depicted in accordance with an illustrative embodiment. The data flow 300 starts by receiving a trigger 302. As described above, the trigger can be time-based triggers which execute in a predefined time interval, user-initiated activity based, which executes upon user input, or when new search results are detected by display manager 316. In this illustrative example, the display manager 316 is configured to communicate with database 314 and monitor database 314 for new information. After receiving the trigger 302, the display manager 316 sends an update request 304 related to a cache node 312 to an internal queue system 306. The internal queue system 306 communicates with dispatcher 308 software that decides the priority of selecting update requests in the internal queue system 306. A worker process 310 is then executed to identify if there are any new search results such as updated search results 214 for the cache node 312. The worker process 310 cross references the new search results with the search results already stored in the cache node 312 and updates cache node 312 with new search results when differences can be identified from cross referencing.

Figure 4:
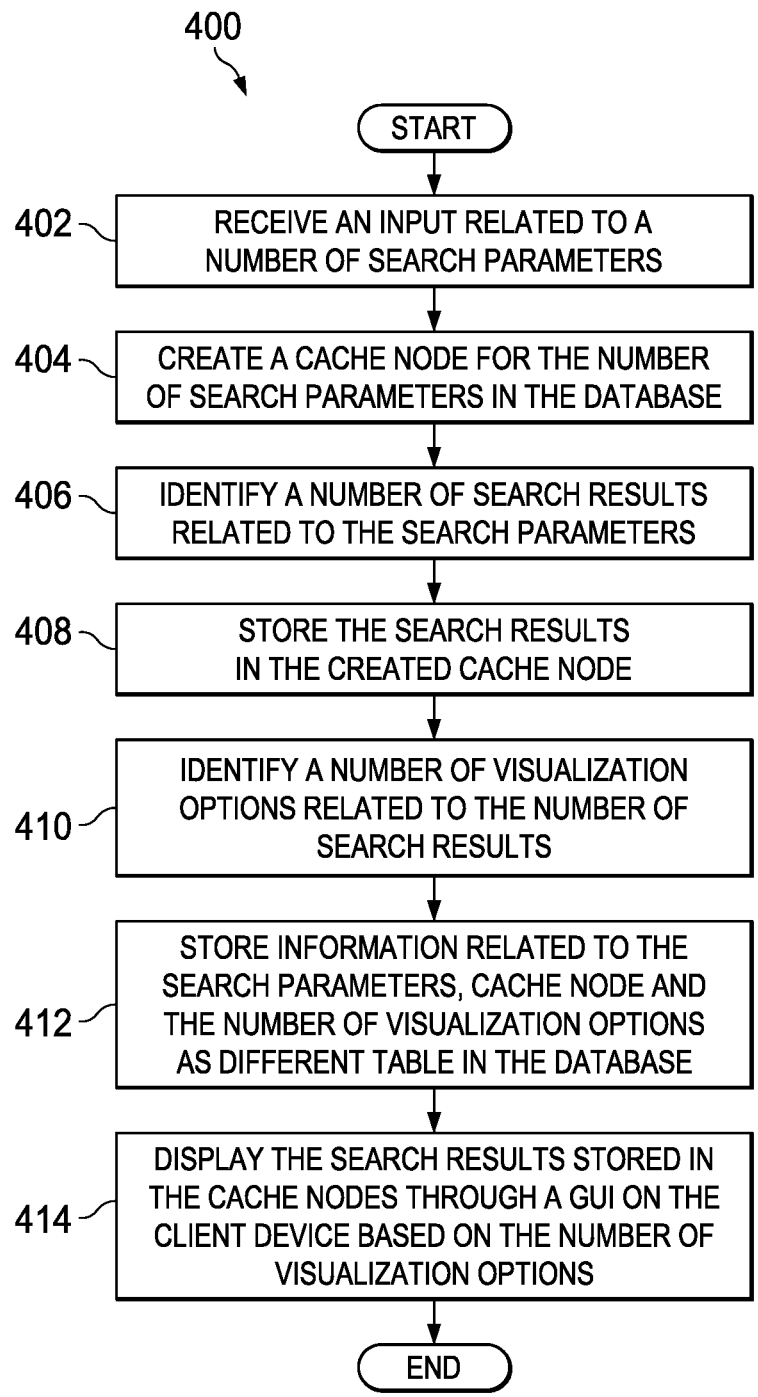
FIG. 4 is a flowchart of a process for data visualization in accordance with an illustrative embodiment.

FIG. 4 depicts a flowchart illustrating a process for data visualization in accordance with an illustrative embodiment. Process 400 can be implemented in hardware, software, or both. When implemented in software, the process can take the form of program code that is run by one or more processor units located in one or more hardware devices in one or more systems. In the illustrative example, the process 400 can be implemented and distributed in display manager 250 and client device 240 in data visualization system 200 in FIG. 2.

Process 400 begins by receiving an input related to a number of search parameters (Step 402). As described above, the input can be submitted by a client or application directly to the database through a web interface or any suitable interfaces.

Process 400 then creates a cache node for the number of search parameters in the database (Step 404). As described above, each created cache node is a representation of a row of information in a cache nodes table stored in the database. In this illustrative example, each cache node is configured to include all cached information related to a search and is configured to cache information until cached information refreshes. In this illustrative example, the cache node can further include a first reference that associate the cache node with the number of search parameters.

Process 400 identifies a number of search results related to the number of search parameters (Step 406). Subsequently, Process 400 stores the search results in the created cache node (Step 408). For example, if a search parameter of "cow" is used as input to search a supply chain database, the data visualization system will create a cache node for this particular search and stores the search parameter "cow" and all relevant search results of "cow." As described above, the search results might include logistic information such as shipment information, for example, number of shipment, number of shipment over time, shipments by country origin, shipment dates, shipment amount, address and name of buyer, address name of seller, size of shipment, geographical data, and matrix data. As described above, the information mentioned above are generated and stored by different units of measurement such as records, weight, volume, and value.

Process 400 identifies a number of visualization options related to the number of search results (Step 410). As described above, the number of visualization options related to the search results can be manually selected by the user conducting the search or automatically selected by the data visualization system using default settings or templates. The selected visualization options further include a second reference that associates the selected visualization option with the created cache node.

Process 400 stores information related to the search parameter, cache node, and the number of visualization options as different tables in the database (Step 412). In this illustrative example, multiple visualization options may be associated with a single cache node.

Process 400 then displays the search results stored in the cache nodes through a graphical user interface on the client device based on the number of visualization options (Step 414). Process 400 terminates thereafter.

FIG. 5 depicts a flowchart illustrating a process for updating a cache node within the data visualization system in accordance with an illustrative embodiment. Process 500 can be implemented in hardware, software, or both. When implemented in software, the process can take the form of program code that is run by one or more processor units located in one or more hardware devices in one or more systems. In the illustrative example, the process 500 can be implemented and distributed in display manager 250 and client device 240 in data visualization system 200 in FIG. 2.

Process 500 begins by receiving an update request related to a cache node (Step 502). In this illustrative example, the cache node already includes a number of search results for a number of search parameter. Here, the search results can be search results gathered from a previously conducted search on the search parameters.

As described above, the data visualization system can be prompted to check if there are new search results related to a search parameter and if an update for the cache node is needed. The update process can be triggered based on time-triggers, user-initiated activity-based triggers initiated by user input, or when the data visualization system detects new search results exists.

Process 500 then submits the update request to an internal queue system (Step 504). In this illustrative example, the update request can be submitted through a platform application such as a web interface. Process 500 selects the update request from the internal queue system to initiate the update process (Step 506). As described above, the internal queue system uses a dispatcher software to determine which update request should be selected first using various algorithm.

Process 500 executes a worker process to identify a number of updated search results of the search parameters (Step 508). As described above, the updated search results can be search results obtained from a newly conducted search for the search parameters. In this illustrative, the updated search results can be stored in the same cache node.

The worker process then cross references the previous search results stored in the cache node for the search parameter with the updated search results for the search parameter (Step 510). In this illustrative example, the worker process checks if there is any new data that might affect the search results stored in the cache node. The worker process updates the search results stored in the cache node with the updated search results when the cross referencing determines an update is needed (Step 512). In an illustrative example, the internal queue system and the worker process can be configured to work in an asynchronized manner. In this case, the update requests submission is working in separated from the internal queue system, avoiding overwhelming the system by executing an excessive amount of requests.

Process 500 displays the number of updated search results through a graphical user interface (Step 514). Process 500 terminates thereafter.

FIG. 6 depicts a flowchart illustrating a process for reproducing a previous search saved within the data visualization system in accordance with an illustrative embodiment. Process 600 can be implemented in hardware, software, or both. When implemented in software, the process can take the form of program code that is run by one or more processor units located in one or more hardware devices in one or more systems. In the illustrative example, the process 600 can be implemented and distributed in display manager 250 and client device 240 in data visualization system 200 in FIG. 2.

Process 600 begins by receiving an input comprising a number of search parameters (Step 602). In this illustrative example, the inputted search parameters can be the search parameters that have been searched from a previously conducted search by the same user or another user who has access to the data visualization system 200.

Process 600 then identifies a cache node related to the search parameters (Step 604). In this illustrative example, the identified cache node already includes a number of search results related to the inputted search parameters. The search results related to the inputted search parameters can be search results that are identified and stored into the cache node from a previously conducted search.

Process 600 identifies a number of visualization options (Step 606). In this illustrative example, the number of visualization options can be visualization options related to the identified search results obtained from the previously conducted search. In some other illustrative examples, process 600 can determine what visualization options to use after the cache node and the search results have been identified.

In some illustrative examples, process 600 can utilize a saved searches table to efficiently identify stored cache nodes and their corresponding search results and visualization options from previously conducted searches.

Process 600 displays the search results in the cache node based on the identified visualization options (Step 608). Process 600 terminates thereafter.

Figure 7:
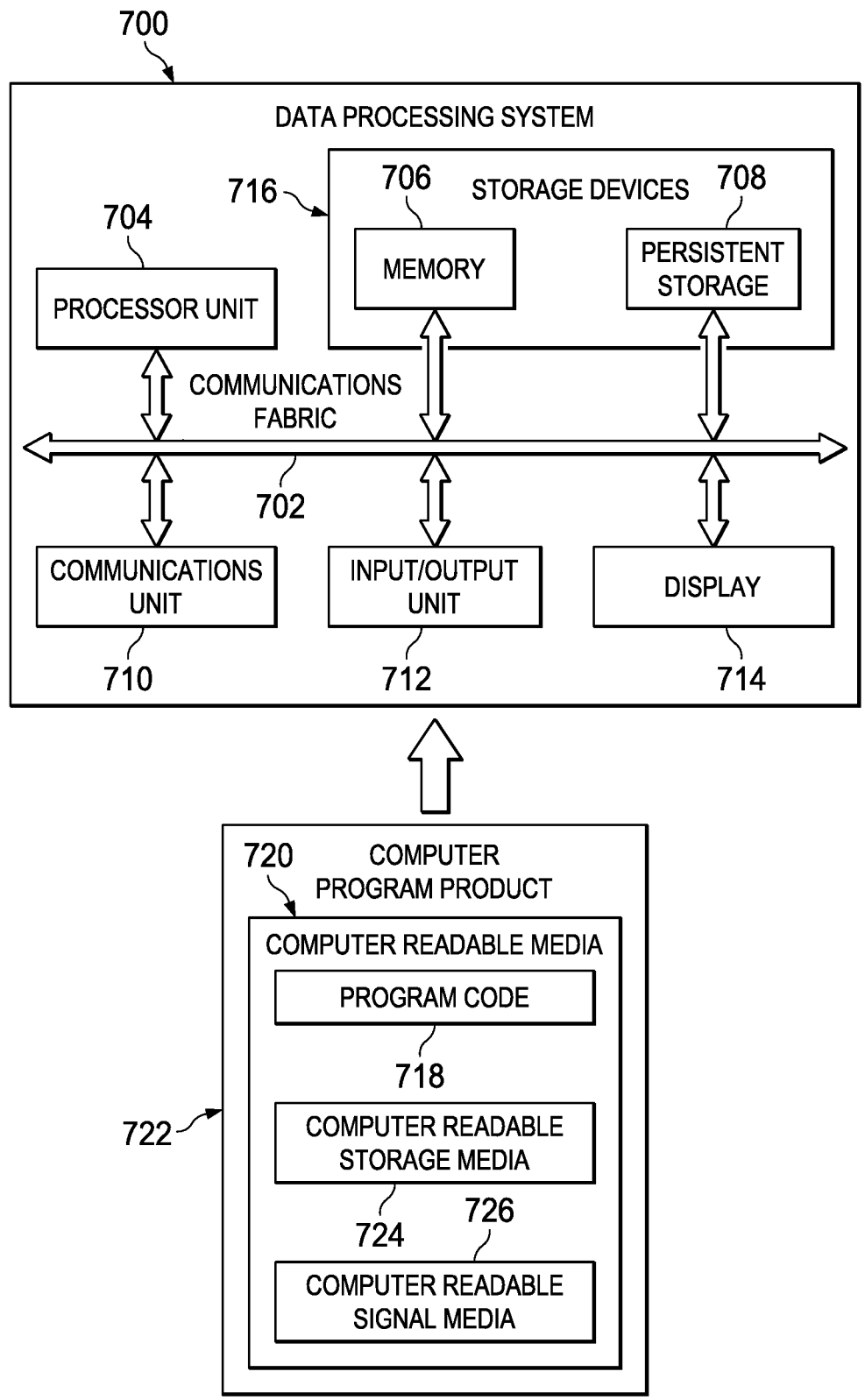
FIG. 7 is a block diagram of a data processing system in accordance with an illustrative embodiment.

Turning now to FIG. 7, an illustration of a block diagram of a data processing system is depicted in accordance with an illustrative embodiment. Data processing system 700 may be used to implement server computer 104 and server computer 106 and client devices 110 in FIG. 1, as well as data visualization system 200 in FIG. 2. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation. In an embodiment, processor unit 704 comprises one or more conventional general-purpose central processing units (CPUs). In an alternate embodiment, processor unit 704 comprises one or more graphical processing units (CPUs).

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708. Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718. Computer readable storage media 724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 718 may be transferred to data processing system 700 using computer-readable signal media 726. Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method to generate a visual representation of data from a database, the method comprising:
   using a number of processors to perform the steps of:
      receiving a first input comprising a number of search parameters;
      responsive to receiving the first input, creating a cache node for the number of search parameters in the database, wherein the cache node comprises a first reference associated with the number of search parameters;
      identifying a number of search results related to the number of search parameters;
      storing the number of search results related to the number of search parameters in the cache node;
      identifying a number of visualization options related to the number of search results stored in the cache node, wherein each visualization option comprises a second reference associated with the cache node;
      receiving a second input comprising the number of search parameters from a second search;
      identifying the cache node associated the number of search parameters from the database;
      retrieving the number of search results stored in the cache node and the number of visualization options related to the number of search results using the second reference; and
      displaying the number of search results stored in the cache node through a graphical user interface, wherein the number of search results are displayed based on the number of visualization options, and wherein a plurality of the number of visualization options are associated with the cache node created in the database.

2. The method of claim 1, further comprising:
   storing information identifying the search parameters, the cache node, and the number of visualization options as different tables in the database, wherein the database is a relational database.

3. The method of claim 2, wherein the cache node further comprising logistic information related to the number of search results comprising source, date, geographical location, address, and size.

4. The method of claim 1, wherein the number of visualization options present analytic visualizations of logistic information, wherein the visualization options comprise aggregate statistics, time series charts, maps, multi-dimensional heatmaps and treemaps.

5. The method of claim 1, wherein the number of visualization options and the number of search results are displayed in a dashboard through the graphical user interface, and wherein the dashboard is saved in a dashboard table in the database.

6. The method of claim 1, further comprises:
determining whether the cache node needs to be updated with a number of updated search results;
cross referencing the number of updated search results with the number of search results; and
updating the cache node with the number of updated search results to replace the number of search results when differences are identified from cross referencing.

7. A computer system comprising:
a display system including a graphical user interface; and
a data visualization system in communication with the display system, wherein the data visualization system is configured to:
receive a first input comprising a number of search parameters;
responsive to receiving the first input, create a cache node in a database for the number of search parameters, wherein the cache node comprises a first reference associated with the number of search parameters;
identify a number of search results related to the number of search parameters;
store the number of search results in the cache node;
identify a number of visualization options related to the number of search parameters, wherein each visualization option comprises a second reference associated with the cache node;
receive a second input comprising the number of search parameters from a second search;
identify the cache node associated the number of search parameters from the database;
retrieve the number of search results stored in the cache node and the number of visualization options related to the number of search results using the second reference; and
display the number of search results stored in the cache node through a graphical user interface, wherein the number of search results are displayed based on the number of visualization options, and wherein a plurality of the number of visualization options are associated with the cache node created in the database.

8. The computer system of claim 7, wherein the data visualization system is further configured to:
store information identifying the search parameters, the cache node, and the number of visualization options as different tables in the database, wherein the database is a relational database.

9. The computer system of claim 8, wherein the cache node further comprising logistic information related to the number of search results comprising source, date, geographical location, address, and size.

10. The computer system of claim 7, wherein the number of visualization options present analytic visualizations of logistic information, wherein the visualization options comprise aggregate statistics, time series charts, maps, multi-dimensional heatmaps and treemaps.

11. The computer system of claim 7, wherein the number of visualization options and the number of search results are displayed in a dashboard through the graphical user interface, and wherein the dashboard is saved in a dashboard table in the database.

12. The computer system of claim 7, wherein the data visualization system is further configured to:
determine whether the cache node needs to be updated with a number of updated search results;
cross reference the number of updated search results with the number of search results; and
update the cache node with the number of updated search results to replace the number of search results when differences are identified from cross referencing.

13. A computer-implemented method to generate a visual representation of data from a database, the method comprising:
using a number of processors to perform the steps of:
receiving a first input comprising a number of search parameters, wherein the number of search parameters has been previously searched;
responsive to receiving the first input, identify a cache node in the database, wherein a number of search results related to the number of search parameters are stored in the cache node;
identifying a number of visualization options related to the number of search results stored in the cache node;
displaying the number of search results related to the number of search parameters in a graphical user interface based on the number of visualization options;
receiving a second input comprising the number of search parameters from a second search;
identifying the cache node associated the number of search parameters from the database;
retrieving the number of search results stored in the cache node and the number of visualization options related to the number of search results using the second reference; and
displaying the number of search results stored in the cache node through a graphical user interface, wherein the number of search results are displayed based on the number of visualization options, and wherein a plurality of the number of visualization options are associated with the cache node created in the database.

14. A computer program product for generating a data visualization, the computer program product comprising a computer readable storage medium having program instructions embodied therewith, the program instructions executable by a computer system to cause the computer system to perform a method comprising:
receive an input comprising a number of search parameters;
responsive to receiving the input, create a cache node in a database for the number of search parameters, wherein the cache node comprises a first reference associated with the number of search parameters;
identify a number of search results related to the number of search parameters;
store the number of search results in the cache node;
identify a number of visualization options related to the number of search parameters, wherein each visualization option comprises a second reference associated with the cache node;
receiving a second input comprising the number of search parameters from a second search;
identifying the cache node associated the number of search parameters from the database;
retrieving the number of search results stored in the cache node and the number of visualization options related to the number of search results using the second reference; and displaying the number of search results stored in the cache node through a graphical user interface, wherein the number of search results are displayed based on the number of visualization options, and wherein a plurality of the number of visualization options are associated with the cache node created in the database.

15. The computer program product of claim 14, wherein the program instructions are executable by the computer system to cause the computer system to perform:

storing information identifying the search parameters, the cache node, and the number of visualization options as different tables in the database, wherein the database is a relational database.

16. The computer program product of claim 15, wherein the cache node further comprising logistic information related to the number of search results comprising source, date, geographical location, address, and size.

17. The computer program product of claim 14, wherein the number of visualization options present analytic visualizations of logistic information, wherein the visualization options comprise aggregate statistics, time series charts, maps, multi-dimensional heatmaps and treemaps.

18. The computer program product of claim 14, wherein the number of visualization options and the number of search results are displayed in a dashboard through the graphical user interface, and wherein the dashboard can bo is saved in a dashboard table in the database.

19. The computer program product of claim 14, wherein the program instructions are executable by the computer system to cause the computer system to perform:

determining whether the cache node needs to be updated with a number of updated search results;

cross referencing the number of updated search results with the number of search results; and updating the cache node with the number of updated search results to replace the number of search results when differences are identified from cross referencing.

* * * * *